United States Patent
Chawla et al.

(10) Patent No.: US 8,041,793 B2
(45) Date of Patent: Oct. 18, 2011

(54) BOOT IMAGE DISCOVERY AND DELIVERY SYSTEM

(75) Inventors: Gaurav Chawla, Austin, TX (US); Charles T. Perusse, Jr., Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 12/236,782

(22) Filed: Sep. 24, 2008

(65) Prior Publication Data

US 2010/0077066 A1    Mar. 25, 2010

(51) Int. Cl.
G06F 15/16    (2006.01)

(52) U.S. Cl. ......................................... 709/222

(58) Field of Classification Search ............... None
See application file for complete search history.

(56) References Cited

U.S. PATENT DOCUMENTS

| | | | |
|---|---|---|---|
| 6,880,002 | B2 | 4/2005 | Hirschfeld et al. |
| 7,207,039 | B2 | 4/2007 | Komarla et al. |
| 2005/0050539 | A1 | 3/2005 | Burkhardt et al. |
| 2005/0138423 | A1 | 6/2005 | Ranganathan |
| 2006/0129797 | A1* | 6/2006 | Durfee et al. ............... 713/2 |
| 2006/0230165 | A1* | 10/2006 | Zimmer et al. ............ 709/230 |
| 2007/0250608 | A1* | 10/2007 | Watt ............................ 709/222 |
| 2007/0260868 | A1* | 11/2007 | Azzarello et al. ............ 713/2 |
| 2008/0091929 | A1* | 4/2008 | Oberhaus et al. ............ 713/1 |
| 2009/0129597 | A1* | 5/2009 | Zimmer et al. ............ 380/277 |
| 2009/0172381 | A1* | 7/2009 | Zimmer et al. .............. 713/2 |

OTHER PUBLICATIONS

Shannon Kietzman, WiseGeek—What Is Provisioning?, 2003-2008, pp. 1-3, Conjecture Corporation, http://www.wisegeek.com/what-is-provisioning.htm.
Cisco Systems—Airespace, Cisco SWAN Release Notes 2.2.127.9, System Release 2.2; Mar. 22, 2005, OL-7431-01 Rev 1, pp. 1-16.
Jacob Cherian, Yuan-Chang Lo and Gaurav Chawla, Single Sign-On For OS Boot Image Provisioning And OS Login Based On User Identity, filed on Dec. 20, 2007, U.S. Appl. No. 11/961,079.
Provisioning—Wikipedia, the free encyclopedia, Provisioning, May 15, 2008, pp. 1-3, Wikipedia Foundation, Inc., http://en.wikipedia.org/wiki/Provisioning.

* cited by examiner

*Primary Examiner* — Ario Etienne
*Assistant Examiner* — Clayton R Williams
(74) *Attorney, Agent, or Firm* — Haynes and Boone, LLP

(57) ABSTRACT

A boot image discovery and delivery system includes one or more subsystems to provide a host device, provide an image discovery client on the host device, transfer control of a start-up initialization to the image discovery client, receive authentication credentials from a centralized database, provide a first boot image to the host device for a first set of credentials and provide a second boot image to the host device for a second set of credentials.

20 Claims, 4 Drawing Sheets

BOOT IMAGE DISCOVERY AND DELIVERY SYSTEM

BACKGROUND

The present disclosure relates generally to information handling systems, and more particularly to a boot image discovery and delivery system for booting an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Initial start-up procedures for an IHS generally include bootstrapping or booting-up the IHS. During a boot-up, a program, such as a basic input/output system (BIOS), initializes and tests hardware, peripherals, external devices and starts-up the IHS operating system (OS).

FIG. 2 illustrates block diagrams of several prior art boot image discovery architectures for use with an information handling system, where the boot image information is stored either in the host BIOS, a network interface card (NIC) option read only memory (ROM) or on a centralized dynamic host configuration protocol (DHCP) server, which associates boot images to the physical media access card (MAC) address of the host, as should be readily understood by a person having ordinary skill in the art. See option 1, 130, option 2, 132, option 3, 134 and option 4, 136. In other words, prior storage solutions for internet small computer system interface (iSCI) boot of diskless hosts (e.g., servers or clients) perform host to boot image association based on the unique physical ID of the host, typically a MAC address, of the NIC port.

In these prior solutions, the location of the boot image is either stored in the persistent (non-volatile) storage in the host BIOS or in the Pre-OS code download through pre-boot execution environment (PXE), which is used to boot-up the client machine. These solutions do not support provisioning images for a logical user or a group of users.

Because boot image location is stored on the host or known to the host via the code downloaded from PXE, these solutions do not customize (e.g., update hardware drivers, update OS boot configuration and etc.), the image dynamically based on the host platform hardware.

Accordingly, it would be desirable to provide an improved boot image discovery and delivery system absent the disadvantages discussed above.

SUMMARY

According to one embodiment, a boot image discovery and delivery system includes one or more subsystems to provide a host device, provide an image discovery client on the host device, transfer control of a start-up initialization to the image discovery client, receive authentication credentials from a centralized database, provide a first boot image to the host device for a first set of credentials and provide a second boot image to the host device for a second set of credentials.

DETAILED DESCRIPTION

For purposes of this disclosure, an information handling system (IHS) 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
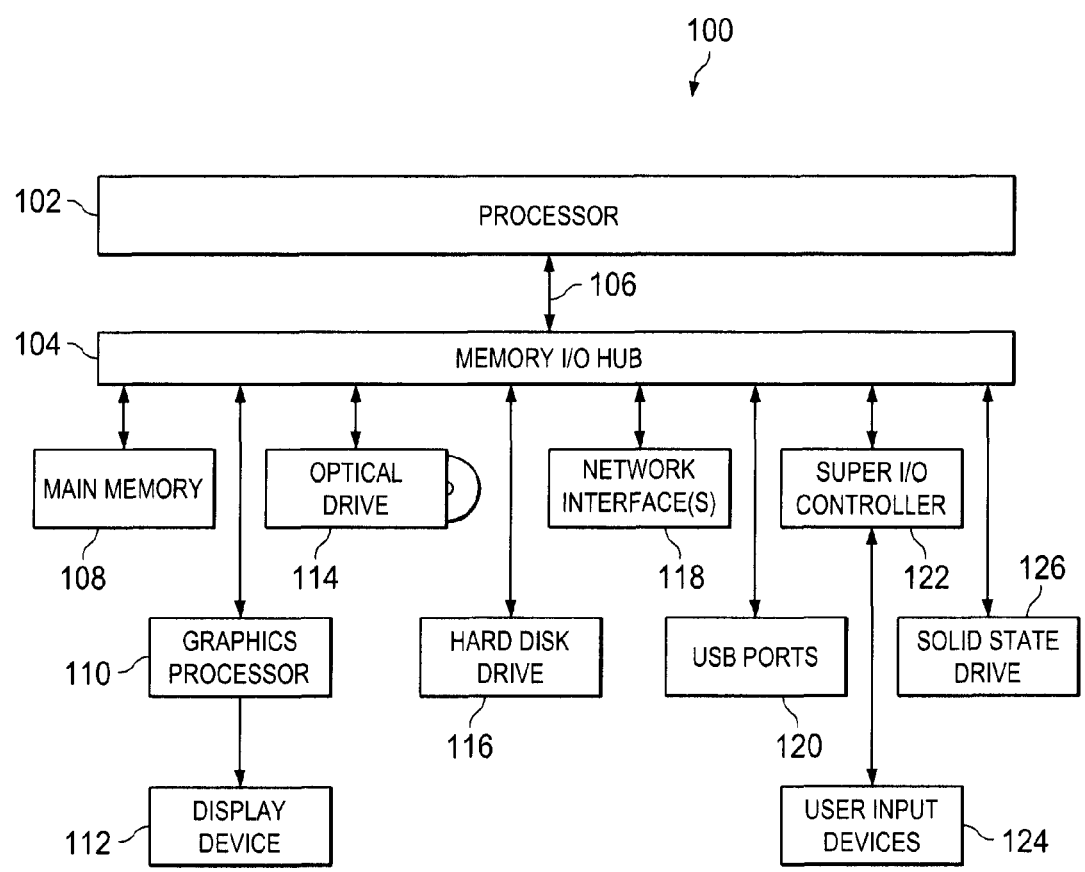
FIG. 1 illustrates a block diagram of an embodiment of an information handling system.
Figure 2:
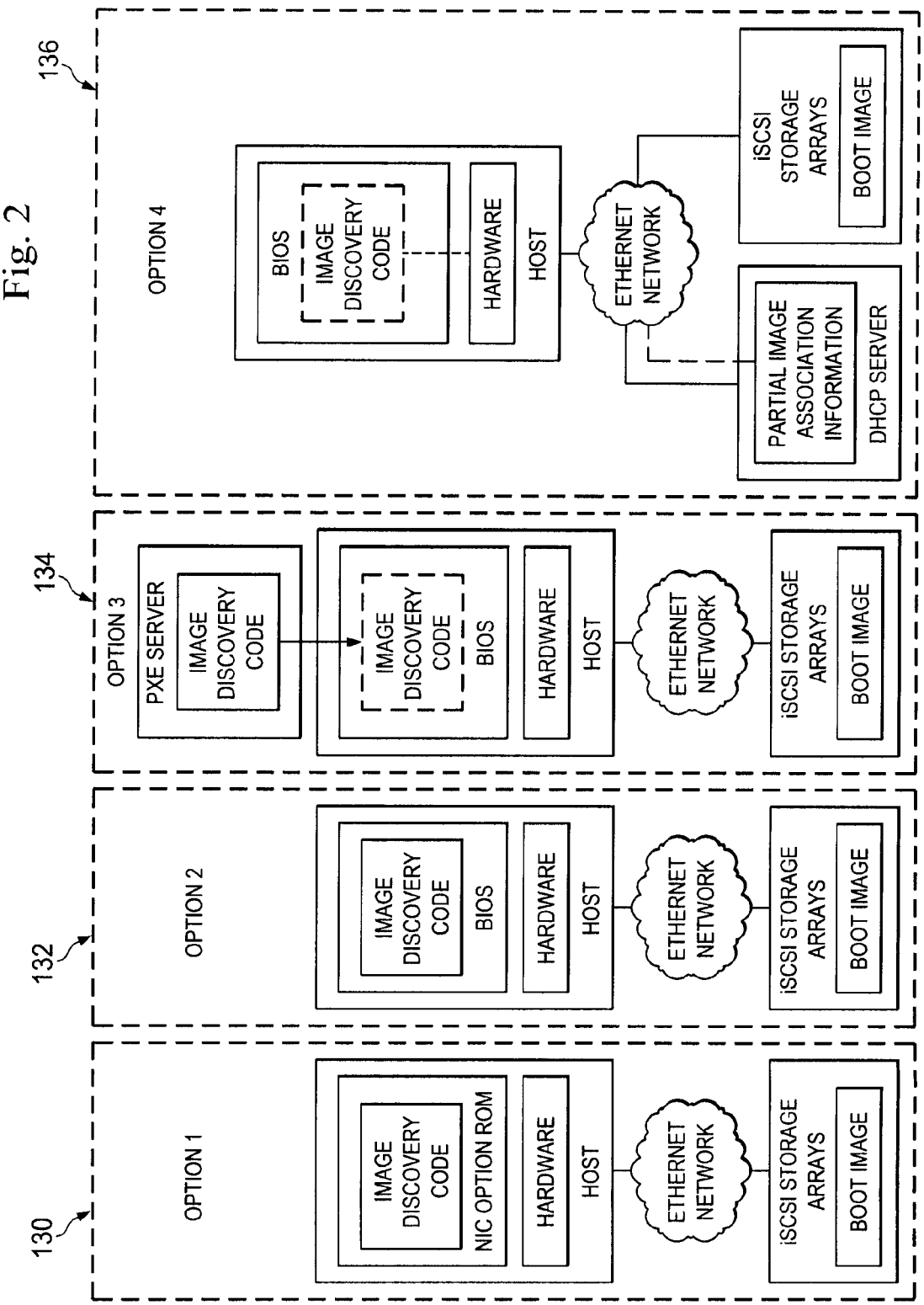
FIG. 2 illustrates block diagrams of several prior art image discovery architectures for use with an information handling system.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 3:
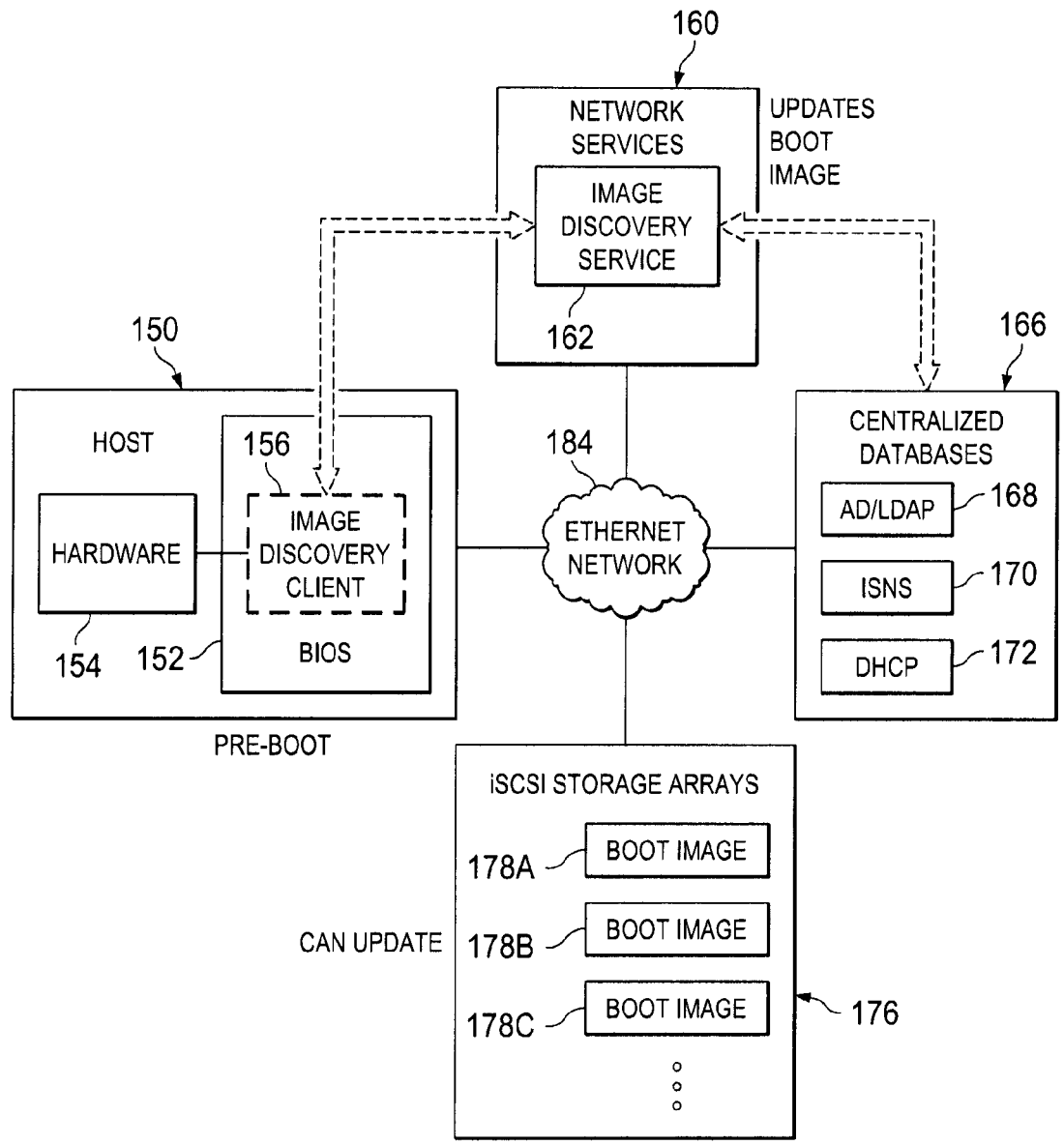
FIG. 3 illustrates a block diagram of an improved image discovery architecture for use with an information handling system.

FIG. 3 illustrates a block diagram of an improved image discovery system architecture for use with an information handling system 100. In an embodiment, the system includes a host 150 having a basic input/output system (BIOS) 152 and associated hardware 154. The hardware 154 may be any of the hardware associated with the IHS 100 shown in FIG. 1, or any other hardware.

In an embodiment, the disclosed solution specifies a system to deliver one or more boot images 178 to a host 150, which may be based on Hall logical user credentials. The credentials may be the user's personal settings, requirements or other preferences for the host 150. The host 150 may be a server, a client, or any other type of IHS 100. The system may also customize the boot image 178A, 1788, 178C for the host 150 hardware platform to ensure that the boot image 178 is bootable on the host 150. In addition, the system may update the boot image 178 when an updated version is available. The architecture shown in FIG. 3 may work across host platforms such as, servers or clients, independent of the computing model used, (e.g., physical or virtual computing models).

As shown in FIG. 3, an embodiment of the disclosure provides a solution where the host 150 platform runs an image discovery client 156. A network services system 160 couples with the host 150 and performs a user authentication and image discovery via a centralized image discovery service 162. The image discovery client 156 may be delivered to the host 150 platform using a variety of methods. For example, the image discovery client 156 may be performed by the host 150 by being stored in the network interface card (NIC) option Read only memory (ROM), integrated into the BIOS 152 or delivered via a pre-boot execution environment (PXE) protocol. The image discovery client may be a unified extensible firmware interface (UEFI) application running on top of a UEFI BIOS. In an embodiment the image discovery client 156 may be run on a physical host or may be in a virtual BIOS of a virtualized host platform running a virtualization application such as, VMWare®, Microsoft®, or Xen®, on a hypervisor type IHS 100. The network services 160 also couples with one or more centralized databases 166, such as lightweight directory access protocol (LDAP) 168, internet storage name service (iSNS) 170, dynamic host configuration protocol (DHCP) 172 and/or a variety of other databases. An internet small computer system interface (iSCSI) storage array 176 may hold any number of boot images 178A, 178B, 178C (called boot image 178 collectively for simplicity). As should be readily understood, the boot images 178A, 178B, 178C are a set of instructions for starting-up the host 150 for performing certain tasks, which may be based on credentials of a user of the host 150. An Ethernet network 184 or similar network may couple the host 150, the network services 160, the centralized databases 166 and/or the iSCSI storage arrays 176 together for communication.

In operation of an embodiment, the host 150 runs an image discovery client 156 that interacts with the imaged discovery service 162 to find a proper boot image 178A, 178B, 178C for the user of the host 150. The image binding and authentication for the user may be stored in a centralized database 166. The image discovery client 156 may be a UEFI application and may be stored in BIOS 152, in a NIC option ROM or may be delivered via a pre-boot execution environment (PXE). In addition, the image discovery client 156 may run on a physical BIOS or on a virtual BIOS provided by a hypervisor in any virtualized environment. The image discovery client 156 communicates with the image discovery service 162 and the image discovery service 162 performs the work related to client authentication, image discovery and image customization for the hardware platform.

Figure 4:
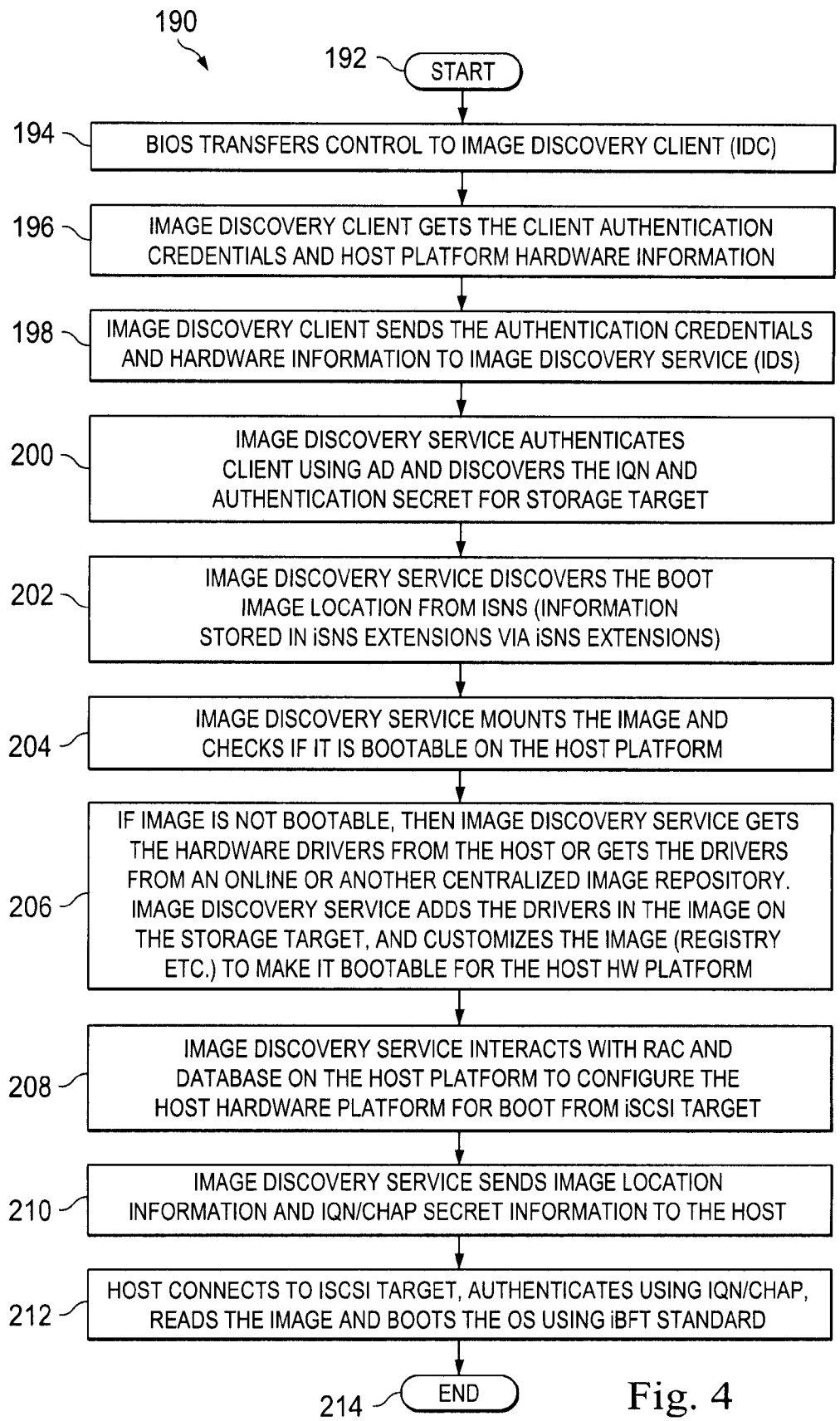
FIG. 4 illustrates a flow chart of an embodiment of a method for image discovery and customization for use with an information handling system.

FIG. 4 illustrates a flow chart of an embodiment of a method for image discovery and customization 190 for use with an information handling system 150, e.g., the host 150. The method 190 starts at 192 where the host 150 is in a pre-boot mode. The method 190 then proceeds to block 194 where the BIOS 152 transfers control of the start-up to the image discovery client 156. The method 190 then proceeds to block 196 where the image discovery client 156 accesses client authentication credentials and host platform hardware information from the host 150. Next the method 190 proceeds to block 198 where the image discovery client 156 communicates the authentication credentials and hardware information to the image discovery service 162. The method 190 then proceeds to block 200 where the image discovery service 162 authenticates the client (e.g., using Active Directory (AD)) and discovers the iSCSI qualified name (IQN) and authentication secret for the storage target. The method 190 next proceeds to block 202 where the image discovery service 162 discovers the boot image location from the internet storage name service (iSNS). In an embodiment, the information may be discovered using information stored in iSNS via iSNS extensions. In an embodiment, the image discovery service 162 may store the authentication and image mapping information in a local database specific to the image discovery service 162. As such, the image discovery service 162 may use a local database to authenticate the host and discover its image. The method 190 then proceeds to block 204 where the information discovery service 162 mounts the boot image 178 and checks to see if the boot image 178 is bootable on the host 150 platform. If the boot image 178 is not bootable on the host 150, the image discovery service 162 loads the hardware drivers from the host 150 or gets the drivers from an online or other centralized image repository, such as the centralized databases 166. In block 206, the image discovery service 162 also adds the drivers in the boot image 178 onto the storage target and customizes boot image 178 (e.g., registry and etc.) to make the boot image 178 bootable for the host 150 hardware platform. The method 190 next proceeds to block 208 where the image discovery service 162 interacts with a remote access controller (RAC) and database on the host 150 platform to configure the host hardware platform 154 for booting from an iSCSI target. Next, the method 190 proceeds to block 210 where the image discovery service 162 sends boot image location information and iQN/challenge-handshake authentication protocol (CHAP) secret information to the host 150. Next the method 190 proceeds to block 212 where the host 150 connects to the iSCSI target and authenticates using IQN/CHAP, reads the boot image 178 and boots the operating system of the host 150 using a standard such as an iBFT standard. The method 190 then ends at 214.

In summary, FIG. 4 shows an embodiment of an overall process for a client authentication, image discovery and operating system boot. The image discovery client 156 may be considered a light weight client. The system gets the user credentials and passes the user credentials and host hardware platform information to the centralized image discovery client 156 or may be discovered using standard protocols like DHCP or service location protocol (SLP). The information required for user authentication and image discovery may be stored in the standard databases such as, the Active Directory and iSNS (iSCSI Name Service). The centralized image discovery service 162 authenticates the user with Active Directory and retrieves the iSCSI IQN and CHAP secret to be used by the host 150. The image discovery service 162 then discovers the boot image 178 for this IQN via extensions to the iSNS server. The image discovery service then mounts the image partition and checks if it has all the device drivers and appropriate registry settings for the host hardware platform 154. If not, then it customizes the image 178 by adding/removing drivers and updating the registry settings. The drivers may be retrieved from a database on the host (e.g., Dell® 11G/12G servers), from an online source or form a centralized repository containing device driver packages. Image discovery service 162 also interacts with the RAC and database on the host 150 platform to configure the host hardware 154 platform to boot from the image 178 on the iSCSI storage array. This may involve changing the Boot order in the BIOS 152 configuration, and updating the image discovery client pre-operating system code etc. After customizing the image, the image discovery service 162 passes the host IQN/CHAP secret information and the image location information to the host 150. The host 150 then connects to a specified iSCSI target, authenticates itself using IQN/CHAP-Secret, retrieves the image, and completes the boot process by handing off control and boot device information to the operating system using a standard such as, the iBFT standard.

Embodiments of the present disclosure may be operable to provision images for physical machines or logical users, and support user mobility by managing all image association information via a centralized service. Embodiments of the present disclosure may also be operable to make clients stateless and allow for quick hardware part replacement. Additionally, embodiments of the present disclosure may be operable to dynamically customize the boot image 178 to ensure bootability on the host hardware platform 154 used by the client. Furthermore, embodiments of the present disclosure may be operable to allow the same boot image 178 to be booted on a physical client or as a virtual machine on a server IHS by dynamically customizing the boot image 178.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A boot image discovery and delivery system, comprising:
 a host device that includes an image discovery client;
 a network services system that is coupled to the host device through a network, wherein the network services system includes an image discovery service;
 at least one database that is coupled to the network services system through the network; and
 at least one storage device that is coupled to the network services system through the network, wherein the at least one storage device stores at least one boot image that is associated with a user;
 wherein the image discovery client is operable to communicate user credentials of the user and hardware information from the host device to the image discovery service via the network;
 wherein the image discovery service is operable, using the user credentials and the at least one database, to authenticate the user and retrieve authentication information associated with the user;
 wherein the image discovery service is operable to discover the at least one boot image associated with the user using at least some of the authentication information associated with the user;
 wherein the image discovery service is operable, using the hardware information, to determine whether the at least one boot image associated with the user includes the appropriate device drivers and registry settings for the host device and, in response to the at least one boot image associated with the user not including the appropriate device drivers and registry settings for the host device, customize the at least one boot image associated with the user by modifying at least one device driver and registry setting to provide at least one customized boot image associated with the user; and
 wherein the image discovery service is operable to communicate customized boot image location information and the authentication information associated with the user to the host device, and the host device is operable to connect to the at least one storage device using the customized boot image location information, provide the authentication information associated with the user, and retrieve the at least one customized boot image associated with the user.

2. The system of claim 1, wherein the image discovery client is stored in a basic input/output system (BIOS) on the host device.

3. The system of claim 1, wherein the image discovery client is stored in a network interface card (NIC) option read only memory (ROM) on the host device.

4. The system of claim 1, wherein the image discovery client is delivered via a pre-boot execution environment (PXE) to the host device.

5. The system of claim 1, wherein the image discovery client is a unified extensible firmware interface (UEFI) application.

6. The system of claim 1, wherein the host device is operable to receive the at least one customized boot image for completing a host device boot process.

7. The system of claim 1, wherein the image discovery client is operable to discover the location of the image discovery service.

8. An network services information handling system (IHS), comprising:
 a processor;
 a network interface coupled to a network, wherein a host device, at least one database, and at least one storage device are coupled to the network; and
 a computer-readable medium coupled to the processor and the network interface, wherein the computer readable medium comprises computer-readable instruction that when executed:
 receive, through the network, user credentials of a user and hardware information about the host device from an image discovery client on the host device;
 use the user credentials and the at least one database to authenticate the user and retrieve authentication information associated with the user;
 use at least some of the authentication information associated with the user to discover at least one boot image that is associated with the user and that is stored on the at least one storage device;

use the hardware information to determine whether the at least one boot image associated with the user includes the appropriate device drivers and registry settings for the host device and, in response to the at least one boot image associated with the user not including the appropriate device drivers and registry settings, customize the at least one boot image associated with the user by modifying at least one device driver and registry setting to provide at least one customized boot image associated with the user; and communicate customized boot image location information and the authentication information associated with the user to the host device.

9. The IHS of claim 8, wherein the image discovery client is stored in a basic input/output system (BIOS) on the host device.

10. The IHS of claim 8, wherein the image discovery client is stored in a network interface card (NIC) option read only memory (ROM) on the host device.

11. The IHS of claim 8, wherein the image discovery client is delivered via a pre-boot execution environment (PXE) to the host device.

12. The IHS of claim 8, wherein the image discovery client is a unified extensible firmware interface (UEFI) application.

13. The IHS of claim 8, wherein the image discovery service retrieves a new device driver through the network.

14. The IHS of claim 8, wherein the appropriate device drivers and registry settings on the host device comprise device drivers and registry settings that would allow the at least one boot image to complete a boot process on the host device.

15. A method to discover and deliver a boot image comprising:

receiving, by an image discovery service on a network services system through a network, user credentials associated with a user and hardware information about a host device from an image discovery client on the host device;

using, by the image discovery service, the user credentials and at least one database that is coupled to the network to authenticate the user and retrieve authentication information associated with the user;

using, by the image discovery service, at least some of the authentication information associated with the user to discover at least one boot image that is associated with the user and stored on at least one storage device that is coupled to the network;

using, by the image discovery service, the hardware information to determine whether the at least one boot image associated with the user includes the appropriate device drivers and registry settings for the host device and, in response to the at least one boot image associated with the user not including the appropriate device drivers and registry settings, customizing the at least one boot image associated with the user by modifying at least one device driver and registry setting to provide at least one customized boot image associated with the user; and communicating, by the image discovery service through the network, customized boot image location information and the authentication information associated with the user to the host device.

16. The method of claim 15, wherein the image discovery client is stored in a basic input/output system (BIOS) of the host device.

17. The method of claim 15, wherein the image discovery client is stored in a network interface card (NIC) option read only memory (ROM) on the host device.

18. The method of claim 15, wherein the image discovery client is delivered via a pre-boot execution environment (PXE) to the host device.

19. The method of claim 15, wherein the image discovery client is a unified extensible firmware interface (UEFI) application.

20. The method of claim 19, wherein the host device is operable to provide the at least one customized boot image for completing a host device boot process.

* * * * *